April 12, 1966     KENJI NEMOTO ETAL     3,245,287
INDEXING DEVICE
Filed Oct. 8, 1963

United States Patent Office 3,245,287
Patented Apr. 12, 1966

3,245,287
INDEXING DEVICE
Kenji Nemoto, Edogawa-ku, Tokyo-to, and Yukio Fujimi, Mitaka-shi, Japan, assignors to Kabushiki Kaisha Daini Seikosha, Tokyo-to, Japan, a joint-stock company of Japan
Filed Oct. 8, 1963, Ser. No. 314,741
Claims priority, application Japan, Dec. 29, 1962, 37/59,481
2 Claims. (Cl. 74—819)

The present invention relates to indexing devices, and more particularly to improved indexing devices which can assure precise working in the manufacture of timepieces.

It is an essential object of the present invention to provide an improved indexing device which can carry out a highly precise indexing in spite of the extreme simplicity of its construction.

Said object, other objects, advantages and characteristic features of the present invention will become clear from the following description taken in conjunction with the accompanying drawings, in which the same or equivalent parts are designated by the same reference numerals and characters, and in which.

Figure 1:
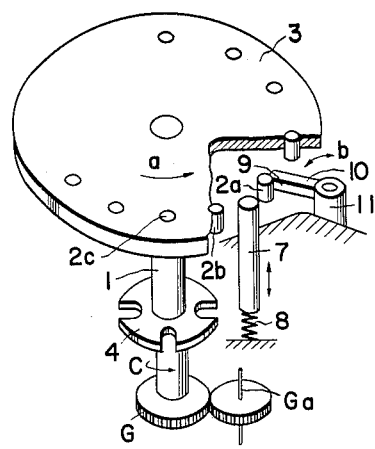
FIG. 1 is a schematic perspective view, partly in section, of one embodiment of the present invention.
Figure 2:
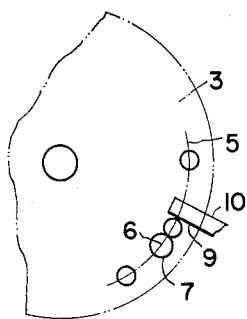
FIG. 2 is a partial, schematic plan view of the embodiment of FIG. 1.
Figure 3:
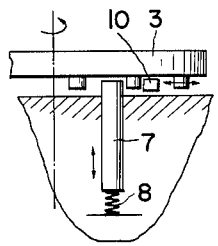
FIG. 3 is a partial schematic side view, partly in section, of the embodiment of FIG. 1.

Referring to FIGS. 1 to 3, the device according to the invention comprises a rotatable shaft 1; an indexing plate or disc 3 provided with several indexing pins 2a, 2b, 2c, etc. directed downwardly with equal angular spacing, the number of said pins corresponding to the indexing number and said disc 3 being mounted on the top of said shaft 1; a Geneva gear 4 affixed to the lower end of said shaft 1, said Geneva gear being adapted to be driven in the arrow direction (c) by means of a conventional driving mechanism such as, for example, a gear train G driven by a driving shaft Ga; and a cylindrical stop 7. This stop 7 is supported so as to be moved up and down by suitable mechanism (not shown) and is affixed at its lower end to a spring 8, said stop 7 being located so that the central axis thereof intersects perpendicularly the locus circle 5 of the central axes of the pins 2a, 2b, 2c, etc. A clamp lever 10 having a side surface 9 adapted to contact with and press one of said indexing pins 2a, 2b, 2c, etc. on the line intersected with said locus circle and the clamp lever 10 is pivotally supported by a shaft operable by a suitable mechanism (not shown). The position of the stop 7 is so selected that it contacts, at its upper position, one side surface of each of the indexing pins 2a, 2b, 2c, etc., its upper end surface is located, at its lower position, under the lower end surface of said pins, and when one of said pins which has been in contact with the stop is detached from the stop toward the next position, the stop 7 is moved down and then raised to the upper position upon completion of one indexing.

The indexing operation of the above-mentioned embodiment of the invention will now be described hereinbelow.

It is first assumed that the indexing pin 2a is clamped between the stop 7 and the clamp lever 10 as shown in FIG. 1. In this state, when the clamp lever 10 is detached from the pin 2a, and the indexing plate 3 is made to rotate in the arrow direction (a) by rotating the Geneva gear 4, the pin 2a is detached from the stop 7, and this stop 7 is lowered. At the same time, the next indexing pin 2b passes over the stop 7, and then the stop 7 is raised upward. Thus, upon completion of one indexing rotation of the indexing plate 3, the pin 2b is stopped at a position apart from the stop 7 with a slight clearance of about 0.2 to 0.3 mm., and then the clamp lever 10 is brought into contact with the pin 2b so as to press firmly said pin 2b onto the stop 7, whereby a highly precise indexing is attained.

In the conventional indexing devices of the type as described above, it has been difficult to attain and maintain precise indexing, because the locking force imparts a radial component, a bending moment or a torsional moment to the rotatable shaft mounted on the indexing plate, shaping of the locking members is complicated, and a finish-indexing operation after a usual indexing is not adopted.

In contrast, according to the indexing device of this invention, since the pressing force of the clamp lever is directed through an indexing pin toward the tangential direction of the indexing plate 3 vibration and other unfavorable effects are not imparted to the shaft of the indexing plate.

As a result of tests conducted on the device of this invention, it has been found that, whereas an error of 15 seconds of angle accompanied the case wherein indexing pins corresponding in number to the required number of indexes were fixed to the indexing plate and the indexing operation was carried out without correction, the indexing precision could be elevated to an error of only 1.5 seconds by correcting the diameters of the indexing pins. In other words, the indexing precision could be corrected and increased ten times. Furthermore, in the device of the present invention, replacement of a worn indexing pin is possible, and the manufacturing of the indexing pins and the stop is very easy because they have cross sections of circular shape, whereby high precision of the device is further assured.

While the invention has been described with respect to particular embodiments thereof, it will be apparent that improvements and modifications may be made therein without departing from the scope of the invention as defined in the appended claims.

We claim:
1. An indexing device, which comprises an indexing plate having indexing pins the number of which corresponds to a required number of indexes, said pins being projected from said plate at equal circumferential distances on a circle concentric to the axis of said plate and each said distance corresponding to one index, an abutment adapted to be moved into an inactive position out of the path of said pins and to an active position in which it is engageable by a selected one of said pins, and means for pressing said selected pin firmly against said abutment, thus determining a selected indexed position of said disc.

2. An indexing device, which comprises an indexing plate having indexing pins the number of which corresponds to a required number of indexes, said pins being projected from said plate at equal circumferential distances on a circle concentric to the axis of said plate and each said distance corresponding to one index, a driving mechanism for intermittently rotating said indexing plate, a cylindrical stop adapted to be lowered into a position out of the way of said pin when said indexing plate is rotated by said distance and to be then raised upward, and a pivotally supported clamp lever adapted to be turned to a position out of the way of said pin when said indexing plate is rotated by said distance and to be then turned to a position pressing said pin against said stop so as to clamp and lock said pin, thus determining one indexing position.

References Cited by the Examiner

UNITED STATES PATENTS 3,048,059   8/1962   Cross _____ 74—813 X

BROUGHTON G. DURHAM, *Primary Examiner.*

J. A. MARSHALL, *Assistant Examiner.*